UNITED STATES PATENT OFFICE.

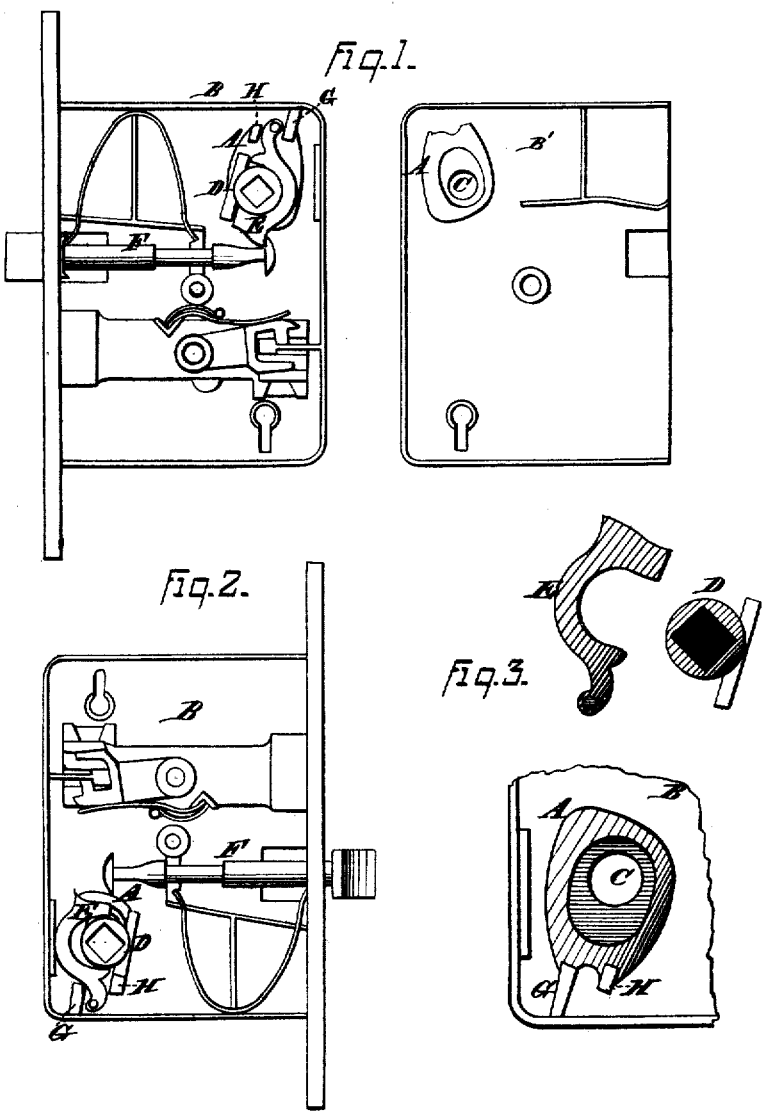

ANDREW F. WHITING, OF CRESTLINE, OHIO.

IMPROVEMENT IN REVERSIBLE LATCHES.

Specification forming part of Letters Patent No. 166,434, dated August 3, 1875; application filed January 25, 1875.

*To all whom it may concern:*

Be it known that I, ANDREW F. WHITING, of Crestline, in the county of Crawford and State of Ohio, have invented certain new and useful Improvements in Locks; and I do hereby declare that the following is a full, clear, and exact description thereof, which will enable others skilled in the art to which it pertains to make and use the same, reference being had to the accompanying drawing, and to the letters of reference marked thereon, which form a part of this specification, in which—

Figure 1 is side views of the lock and one side thereof removed, exhibiting its internal construction and arrangement. Fig. 2 is a view of the lock, with one side or half removed, and in an inverted position, showing the latch-bolt disengaged from its actuating-lever; and Fig. 3 is views of the said lever, knob-spindle hub, and a detachment of the lock-case, exhibiting an enlarged view of the oblong or eccentric-shaped rim around the knob-spindle opening, &c.

Corresponding parts in the several figures are denoted by like letters.

This invention relates to a certain improvement in locks; and it consists of an oblong rim formed on the interior of the lock-case, and disposed eccentrically to the knob-spindle opening, to guide and limit the movement of the spindle-hub and latch-bolt-actuating lever, which is also fulcrumed thereon, and guided and retained in place by projections on the lock-case and above the said rim, substantially as hereinafter more fully set forth.

In the annexed drawing, A refers to an oblong rim formed one-half on each half of the lock-case B B', and disposed eccentrically to the knob-spindle opening C. Upon the lower inner surface or circumference of the rim A rests the knob-spindle hub D, upon which fits or rests the latch-bolt-actuating lever E, fulcrumed upon the said rim. It will be observed that by inverting the lock, the knob-spindle being withdrawn, the hub D will have a limited amount of movement within, and be guided by, the rim A, imparting, in turn, movement to the lever E, which will disengage it from the latch-bolt F, allowing it to be thrown out by its spring sufficiently to be turned or reversed, after which, by reversing the lock, the hub and lever will fall or return to their former position, when, by simply pushing the latch-bolt in, it will engage with, and be held to, the lever, as shown in Fig. 1. The projection or plate G forms a bearing for the upper end of the lever E as it vibrates or moves on its axis, it being formed with the lock-case, and in proximity therewith; and at the upper end or portion of the rim A a second projection, H, similarly fastened to the lock-case, and arranged upon the opposite side of the lever E, prevents it from leaving its place as it moves with the hub D in reversing the latch-bolt. The knob-spindle hub is also prevented from leaving its place, when the knob-spindle is withdrawn, by means of the rim A, it resisting the pressure of the bolt-spring, and avoiding its derangement.

Having thus described my invention, what I claim, and desire to secure by Letters Patent, is—

1. The oblong rim A, formed on the interior of the lock-case B B', and disposed eccentrically to the knob-spindle opening, in combination with the knob-spindle hub and the latch-actuating lever E, substantially as and for the purpose set forth.

2. The projections G H and rim A, formed on the lock-case B B', hub D, and lever E, in combination, substantially as and for the purpose set forth.

In testimony that I claim the foregoing as my own, I affix my signature in presence of two witnesses.

ANDREW F. WHITING.

Witnesses:
 JOHN VETTER,
 FRANK WHITING.